Figure 1:
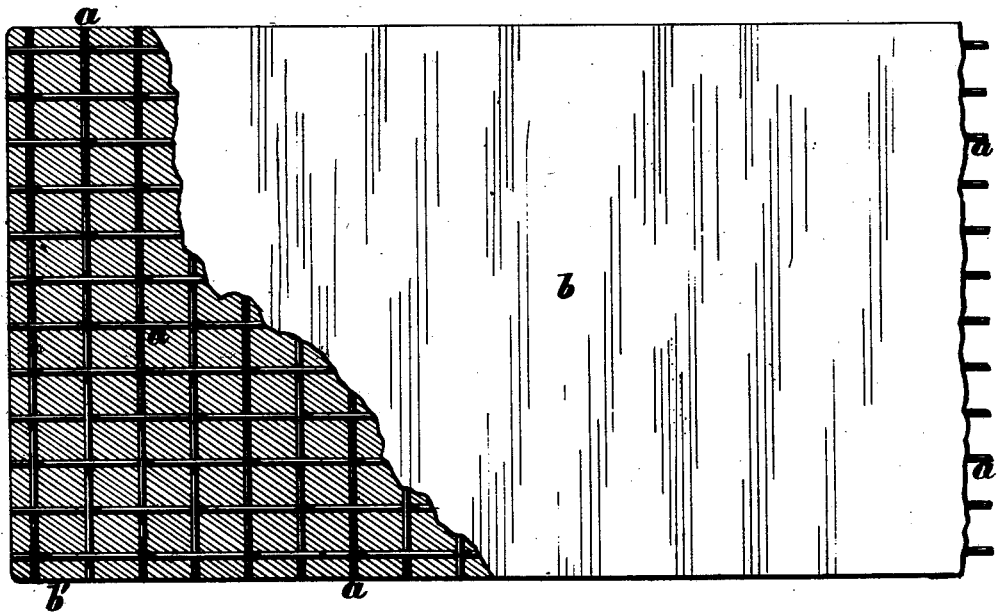

J. BEARDMORE.
Sheet-Rubber for Packing, &c.

No. 214,083.  Patented April 8, 1879.

UNITED STATES PATENT OFFICE.

JOSEPH BEARDMORE, OF COVINGTON, KENTUCKY.

IMPROVEMENT IN SHEET-RUBBER FOR PACKING, &c.

Specification forming part of Letters Patent No. 214,083, dated April 8, 1879; application filed February 8, 1879.

*To all whom it may concern:*

Be it known that I, JOSEPH BEARDMORE, of Covington, in the county of Kenton and State of Kentucky, have invented certain Improvements in Sheet-Rubber for Packing and other purposes, of which the following is a specification.

My invention relates to an improvement in sheet-rubber that is designed to make the rubber stronger, tougher, and less liable to give way or blow out when used as a packing or for other similar purposes.

Heretofore the manufactures of sheet-rubber have been either in a simple piece of solid rubber without any intervening material, or secured to a backing of cloth, or provided with a cloth insertion, or a wide piece of duck coated with a thim film of rubber and folded over wire-gauze.

In cloth insertion the rubber is applied on either side of the cloth, but does not sufficiently extend through the interstices of the cloth and connect the two sides to be entirely homogeneous. In the case of the coated duck, the latter formed the body, and the material did not pass through and fill the interstices in such manner as to firmly unite the two layers; but, on the contrary, the two sheets were easily separable from the gauze and from each other.

My packing is distinguishable from the others in that its entire body is one solid homogeneous mass of rubber, and that the wire is embedded within the same.

By inserting a wire-cloth made of any of the metals, whichever may be most desirable, in the body of the rubber during the process of manufacture, the rubber from each side connects through the interstices in the wire and becomes firmly united, so that the whole mass is tough and firm and not easily separated.

This sheet-rubber, with inserted wire-cloth, is manufactured in the ordinary methods of making rubber—that is, while the rubber is being rolled the wire-cloth is laid upon one thin-rolled sheet of rubber, then another sheet rolled upon it, so that the wire becomes firmly embedded in the rubber, and the rubber above it and below it connects itself together during the process of rolling. Of course any of the known methods of making rubber cloth may be applied.

The purpose for which I have more especially used this new manufacture of rubber is as a packing for steam-joints, water-joints, and, indeed, for all purposes where packing is required.

By reason of the wire-cloth being inserted in the rubber during the process of manufacture, the wire will not be exposed to the action of water or steam, and will, therefore, not corrode. It also gives such toughness to the rubber that the packing will not crawl, expand, or shrink when properly used any more than the ordinary expansion of the joint in which it is used. Neither will it blow out, as the wire imparts such strength as to prevent this in most cases. For instance, if by the twisting of a joint from the settling of a building or other cause the packing should have such a strain placed upon it as to sever the ordinary rubber packing, so as to make a fracture, this, by reason of its much greater strength, will remain firm and intact.

Any appropriate wire may be used for this purpose. It may be made of the ordinary iron wire, or of brass, or copper, or any metal that is sufficiently ductile and tough. I find that about fifteen (15) strands to the inch furnishes a good wire for this purpose, although, of course, this will vary according to the thickness and strength of the packing desired. For instance, in a thick stiff packing it may be desired to have the wires large in size and not so many strands to the inch, while in a very thin packing it may be desired to have the wires fine and more closely connected together, the object being to impart toughness to the rubber and to have the wire-cloth of such a number of strands as to make the meshes between the wires sufficiently large for the rubber to firmly adhere. Sometimes, where a very stiff packing is desired, two or more layers of wire may be embedded between different layers of the rubber.

While I regard this as specially desirable for packing purposes, it may be used for any purpose where a tough rubber web is required, as for belting and hose, &c.

Figure 2:
Figure 3:
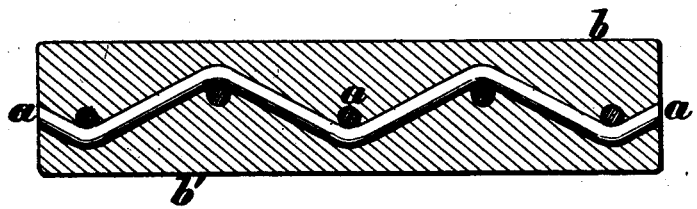

In the drawings, Figure 1 represents a plan view of my new sheet-rubber, from a part of which the upper rubber surface down to the wire-cloth or wire-netting is removed, so as to show the manner in which the netting is embedded in the rubber. Fig. 2 shows the edge of my new sheet-rubber, a part of the section being cut equidistant between two wires, the other part cut next to one of the wires. Fig. 3 is a sectional view.

These drawings show clearly how the wire cloth or netting is embedded into the homogeneous mass of rubber, so as to give consistency and toughness to the same.

$a\,a\,a$ represent the wire; $b$, the upper surface, and $b'$ the lower surface, of the rubber.

It will be observed that when a sheet of rubber is rolled out in the dough, a wire netting or cloth placed over it, and then another sheet of rubber in the dough rolled over the whole, by reason of the size of the interstices between the filaments of wire, the rubber becomes compact and solid in one mass, as shown in the cross-section in Fig. 3.

What I claim as new, and desire to secure by Letters Patent, is—

1. The process of manufacturing packing, consisting in rolling two sheets of rubber, introducing wire-gauze between them, and rolling them together through the gauze, so as to form a solid homogeneous body.

2. The improvement in the art of manufacturing rubber packing, consisting in rolling two layers of rubber from the mass and immediately together into one homogeneous body, and at the same time incorporating therein wire-gauze, as described and shown.

3. As a new article of manufacture, a solid sheet of rubber having wire-netting embedded in its interior without the interposition of other materials.

JOSEPH BEARDMORE.

Witnesses:
JOHN KELLY,
WM. L. WRIGHT, Jr.